(12) United States Patent  
Hung et al.

(10) Patent No.: US 8,330,738 B2  
(45) Date of Patent: *Dec. 11, 2012

(54) CAPACITIVE TOUCH PANEL AND ELECTRODE STRUCTURE THEREOF

(75) Inventors: Yen Chung Hung, Tai Chung (TW); Ruey-Shing Weng, Kao Hsiung (TW); Chih-Chang Lai, Tai Chung County (TW)

(73) Assignee: Wintek Corporation, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/093,348

(22) Filed: Apr. 25, 2011

(65) Prior Publication Data

US 2011/0199332 A1  Aug. 18, 2011

Related U.S. Application Data

(63) Continuation of application No. 12/342,513, filed on Dec. 23, 2008.

(30) Foreign Application Priority Data

Dec. 24, 2007  (TW) .............................. 96149671 A

(51) Int. Cl.  
*G06F 3/041* (2006.01)

(52) U.S. Cl. ..................................... 345/173; 178/18.06

(58) Field of Classification Search .................. None  
See application file for complete search history.

(56) References Cited

U.S. PATENT DOCUMENTS

| | | | | |
|---|---|---|---|---|
| 7,969,539 | B2 * | 6/2011 | Sakurai | 349/110 |
| 2008/0122793 | A1 * | 5/2008 | Watanabe et al. | 345/173 |
| 2008/0165158 | A1 * | 7/2008 | Hotelling et al. | 345/174 |
| 2008/0218951 | A1 * | 9/2008 | Kusuda et al. | 361/681 |
| 2009/0087655 | A1 * | 4/2009 | Yamada et al. | 428/354 |
| 2009/0102814 | A1 * | 4/2009 | Lin et al. | 345/174 |
| 2011/0181549 | A1 * | 7/2011 | Hotelling et al. | 345/174 |

FOREIGN PATENT DOCUMENTS

JP  11066996 A  *  3/1999

* cited by examiner

*Primary Examiner* — Adam R Giesy  
(74) *Attorney, Agent, or Firm* — Muncy, Geissler, Olds & Lowe, PLLC

(57) ABSTRACT

A transparent capacitive touch panel comprising a transparent substrate, a transparent cover lens and a transparent adhesive layer is provided, wherein a first transparent electrode layer and a second transparent electrode layer are disposed on the transparent cover lens and the transparent substrate respectively. The transparent adhesive layer is used to bind the first transparent electrode layer and second transparent electrode layer in order to combine the transparent cover lens and the transparent substrate disposed in parallel. Thereby, the manufacturing process of the transparent capacitive touch panel is simplified, and the manufacturing cost of the same is lowered.

9 Claims, 8 Drawing Sheets

600

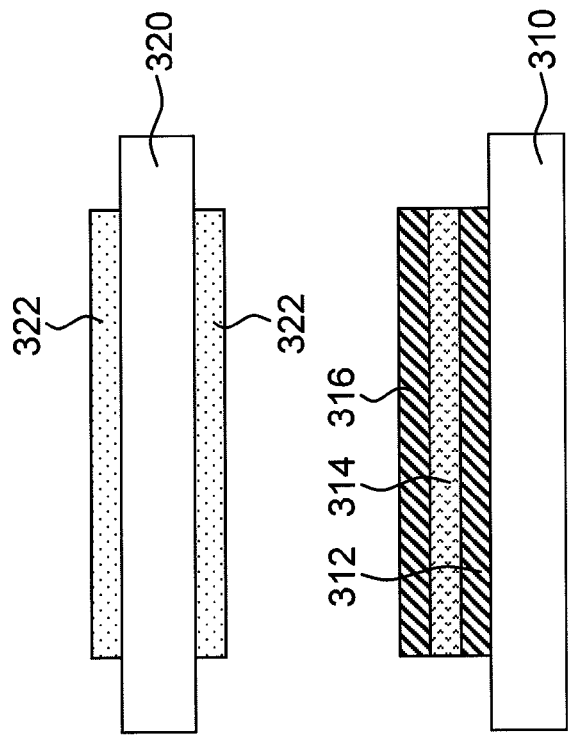
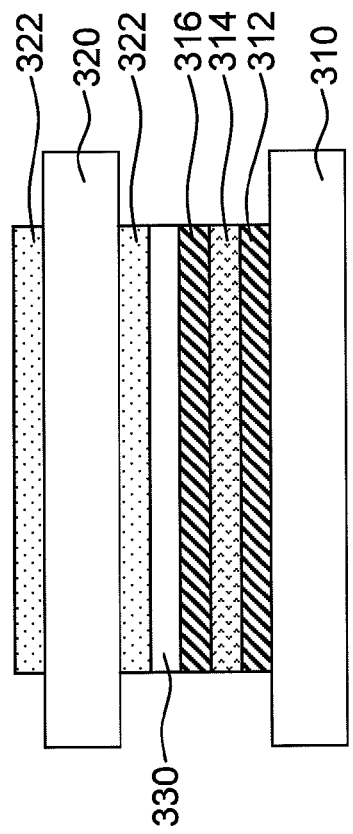
FIG. 3A (Prior Art)
FIG. 3B (Prior Art)

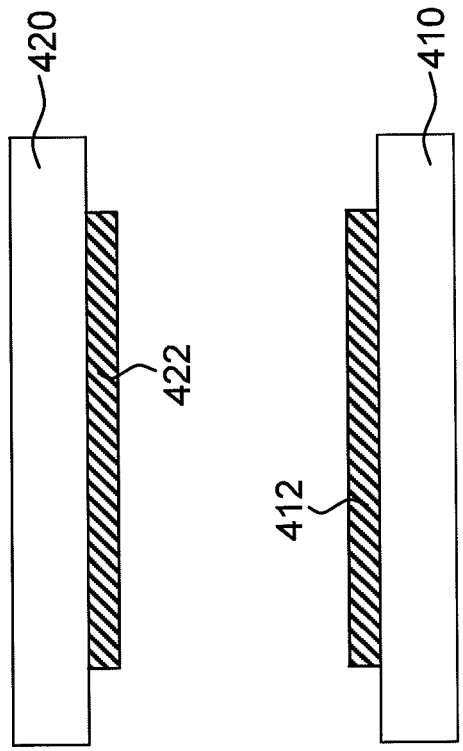
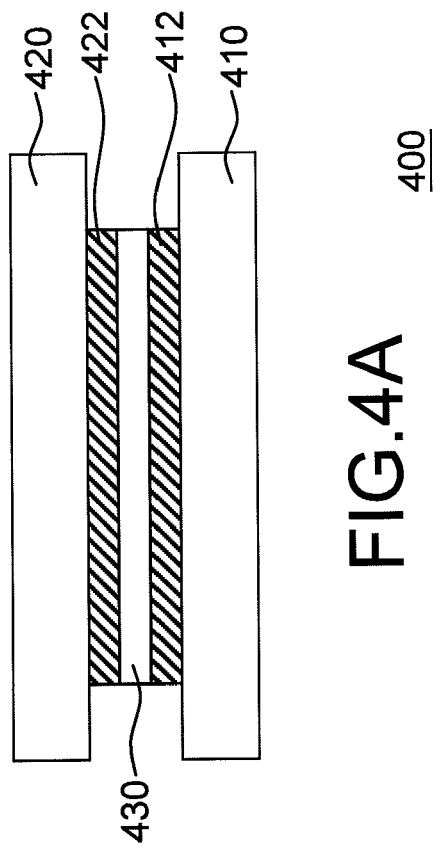

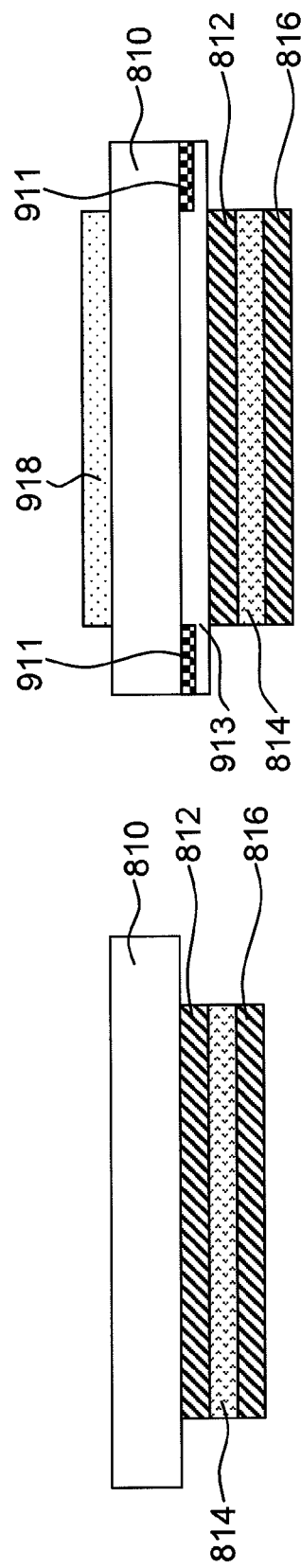
FIG. 9
FIG. 8

CAPACITIVE TOUCH PANEL AND ELECTRODE STRUCTURE THEREOF

CROSS-REFERENCE TO RELATED APPLICATIONS

This application is a continuation of application Ser. No. 12/342,513, filed on Dec. 23, 2008.

BACKGROUND OF THE INVENTION

1. Field of the Invention

The present invention generally relates to a touch panel and, more particularly to a transparent capacitive touch panel.

2. Description of the Prior Art

With the development in technologies, the electronic products having a touch panel as input such as personal digital assistants (PDA's), handsets, car navigating systems, tablet personal computers (PC's) have been widely used. The touch panel is provided on the screen for the user to use input information by a finger or a touch pen. There have been various kinds of touch panels developed. For example, the capacitive touch panel is based on the detection of the change of capacitance. Compared to the resistive touch panel based on direct touch, the capacitive touch panel exhibits higher transparency and longer lifetime.

FIG. 1A is a cross-sectional view of a conventional transparent capacitive touch panel, and FIG. 1B is an exploded view of the transparent capacitive touch panel in FIG. 1A. Please refer to FIG. 1A and FIG. 1B, the conventional transparent capacitive touch panel 100 comprises a dual-layer structure, which comprises a bottom transparent substrate 110, a top transparent substrate 120 and a transparent cover lens 130. A top indium-tin oxide layer 122 and a bottom indium-tin oxide layer 112 are respectively formed on the surfaces of the top transparent substrate 120 and the bottom transparent substrate 110. Two anti-reflection layers 132 are deposited respectively on the surfaces on both sides of the transparent cover lens 130.

Then, an optical adhesive 140 is used to bind the top transparent substrate 120 and the bottom transparent substrate 110 so that the optical adhesive 140 is sandwiched between the top indium-tin oxide layer 122 and the bottom indium-tin oxide layer 112 facing each other. The transparent cover lens 130 is bound with the top transparent substrate 120 by an optical adhesive 150 bind so as to complete the assembly of the transparent capacitive touch panel 100. The transparent cover lens 130 is used to protect the top transparent substrate 120 and the bottom transparent substrate 110.

Since the transparent capacitive touch panel 100 is too thick, another conventional structure is provided to reduce the thickness as shown in FIG. 2. More particularly, FIG. 2A is a cross-sectional view of another conventional transparent capacitive touch panel, and FIG. 2B is an exploded view of the transparent capacitive touch panel in FIG. 2A. Please refer to FIG. 2A and FIG. 2B, the conventional transparent capacitive touch panel 200 comprises a transparent substrate 210 and a transparent cover lens 220. A top indium-tin oxide layer 212 and a bottom indium-tin oxide layer 214 are successively formed respectively on the surfaces of the transparent substrate 210. Two anti-reflection layers 222 are deposited respectively on the surfaces on both sides of the transparent cover lens 220.

Then, an optical adhesive 230 is used to bind the transparent cover lens 220 and the transparent substrate 210 so as to complete the assembly of the transparent capacitive touch panel 200. Even though the transparent capacitive touch panel 200 is thinner, the manufacturing process is more complicated.

More particularly, the top indium-tin oxide layer 212 and the bottom top indium-tin oxide layer 214 are formed on the surface of the transparent substrate 210. After the indium-tin oxide layer 212 is formed, the transparent substrate 210 is turned up side down so that the indium-tin oxide layer 214 can be formed. However, this causes the top indium-tin oxide layer 212 to be harmed by contacting the platform or the robot arms and lower the manufacturing yield of the transparent capacitive touch panel 200.

FIG. 3A is a cross-sectional view of still another conventional transparent capacitive touch panel, and FIG. 3B is an exploded view of the transparent capacitive touch panel in FIG. 3A. Please refer to FIG. 3A and FIG. 3B, the conventional transparent capacitive touch panel 300 comprises a transparent substrate 310 and a transparent cover lens 320. A bottom indium-tin oxide layer 312, an insulating layer 314, a top indium-tin oxide layer 316 are successively formed on the surface of the transparent substrate 310. Two anti-reflection layers 322 are deposited respectively on the surfaces on both sides of the transparent cover lens 320.

Then, an optical adhesive 330 is used to bind the transparent cover lens 320 and the transparent substrate 310 so as to complete the assembly of the transparent capacitive touch panel 300. Even though the transparent capacitive touch panel 200 is thinner, the manufacturing process is more complicated.

However, there are still problems in manufacturing two indium-tin oxide layers on a single side of the transparent substrate 320.

More particularly, conventionally, the formation of the insulating layer 312 results in longer manufacturing time and cost of the transparent capacitive touch panel 300. Moreover, a contact window (not shown) has to be formed in the insulating layer 312 so that the top indium-tin oxide layer 316 is electrically connected to an integrated circuit (IC) (not shown) on the transparent substrate 310. The formation of the contact window leads to increased cost for preparing a mask. Therefore, the manufacturing cost and complexity of the transparent capacitive touch panel 300 is significantly increased.

SUMMARY OF THE INVENTION

It is one object of the present invention to provide a transparent capacitive touch panel with lowered manufacturing cost, simplified assembly and reduced thickness and weight.

It is another object of the present invention to provide a method for manufacturing a transparent capacitive touch panel with a simplified process to result in a high manufacturing yield.

In order to achieve the foregoing and other objects, the present invention provides a transparent capacitive touch panel, comprising: a transparent cover lens; a transparent substrate; a first transparent electrode layer; a second transparent electrode layer and a transparent adhesive layer, wherein the transparent cover lens is in parallel with the transparent substrate, the first transparent electrode layer and the second transparent electrode layer are respectively disposed on the surfaces of the transparent cover lens and the transparent substrate, and the transparent adhesive layer is used to bind the first transparent electrode layer and the second transparent electrode layer to combine the transparent cover lens and the transparent substrate.

In order to achieve the foregoing and other objects, the present invention provides a method for manufacturing a transparent capacitive touch panel, comprising steps of: providing a transparent cover lens and forming a first transparent electrode layer on a surface of the transparent cover lens; providing a transparent substrate and forming a second transparent electrode layer on a surface of the transparent substrate; and disposing the transparent cover lens and the transparent substrate in parallel, and providing a transparent adhesive layer for binding the first transparent electrode layer and the second transparent electrode layer to combine the transparent cover lens and the transparent substrate.

In order to achieve the foregoing and other objects, the present invention provides a transparent capacitive touch panel, comprising: a transparent cover lens; a first transparent electrode layer; an insulating layer and a second transparent electrode layer; wherein the first transparent electrode layer is disposed on a surface of the transparent cover lens, the insulating layer is disposed on a surface of the first transparent electrode layer that is different from the other surface whereon the transparent cover lens is disposed, and the second transparent electrode layer is disposed on a surface of the insulating layer that is different from the other surface whereon the first transparent electrode layer is disposed.

In order to achieve the foregoing and other objects, the present invention provides a method for manufacturing a transparent capacitive touch panel, comprising steps of: providing a transparent cover lens and forming a first transparent electrode layer on a surface of the transparent cover lens; forming an insulating layer on a surface of the first transparent electrode layer; and forming a second transparent electrode layer on a surface of the insulating layer.

In one embodiment of the present invention, the transparent capacitive touch panel further comprises an anti-reflection layer. The anti-reflection layer can be disposed on a surface of the transparent cover lens that is first different from the other surface whereon the transparent electrode layer is disposed. The anti-reflection layer can also be disposed between the transparent cover lens and the first transparent electrode layer.

In one embodiment of the present invention, the first transparent electrode layer and the second transparent electrode layer comprises indium-tin oxide (ITO) or indium-zinc oxide (IZO), the transparent adhesive layer is a double-sided adhesive tape or a liquid-phase transparent adhesive, the transparent cover lens comprises plastic or glass, and the transparent substrate comprises glass or tempered glass.

In one embodiment of the present invention, the transparent capacitive touch panel further comprises a shielding layer, disposed on a surface of the transparent substrate that is different from the other surface whereon the second transparent electrode layer is disposed. The shielding layer comprises indium-tin oxide or indium-zinc oxide.

In one embodiment of the present invention, the transparent capacitive touch panel further comprises a decoration layer and a planarization layer, wherein the decoration layer is disposed between the transparent cover lens and the first transparent electrode layer, and the planarization layer is disposed between the decoration layer and the first transparent electrode layer. The decoration layer is monochromatic (for example, black) or multi-chromatic. Moreover, the decoration layer can be patterned with symbols and texts. The decoration layer comprises an insulating material or a conductive material, while the planarization layer comprises an insulating material.

Accordingly, in the transparent capacitive touch panel of the present invention, the first transparent electrode layer and the second transparent electrode layer are respectively formed on the surfaces of the transparent cover lens and the transparent substrate, and then the transparent cover lens and the transparent substrate are attached. Compared to the prior arts, in the present invention, no transparent electrode layer is required to be formed on the transparent substrate. Therefore, the manufacturing process is simplified with higher manufacturing yield. Moreover, in the present invention, no insulating layer is required so that the manufacturing process is simplified to reduce the manufacturing cost of the transparent capacitive touch panel.

BRIEF DESCRIPTION OF THE DRAWINGS

The objects, spirits and advantages of the preferred embodiments of the present invention will be readily understood by the accompanying drawings and detailed descriptions, wherein:

FIG. 3A and FIG. 3B are cross-sectional views of still another conventional transparent capacitive touch panel;

FIG. 4A and FIG. 4B are cross-sectional views of a transparent capacitive touch panel according to a first embodiment of the present invention;

FIG. 8 is a cross-sectional view of a transparent capacitive touch panel according to a second embodiment of the present invention; and FIG. 9 is a cross-sectional view of another transparent capacitive touch panel according to a second embodiment of the present invention.

DETAILED DESCRIPTION OF THE PREFERRED EMBODIMENT

Figures 1A, 1B:
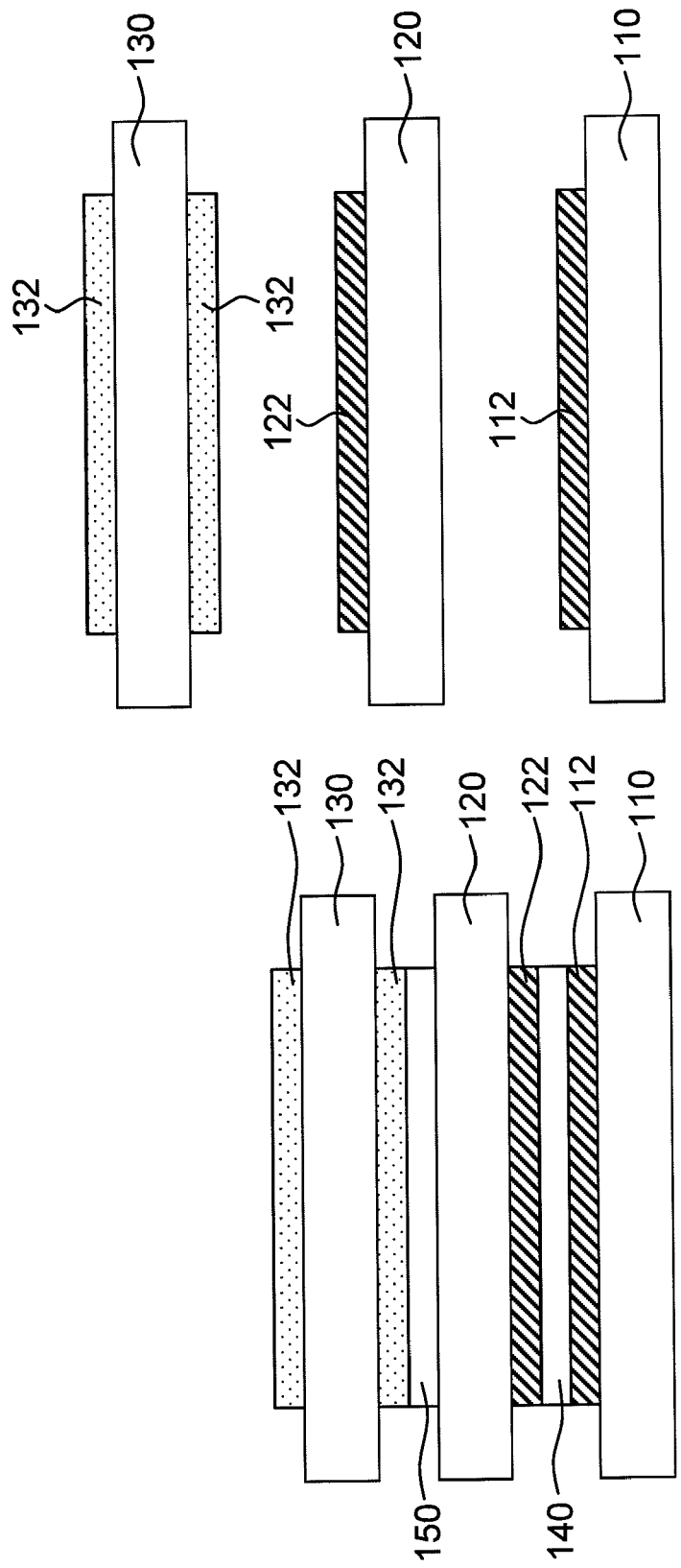
FIG. 1A and FIG. 1B are cross-sectional views of a conventional transparent capacitive touch panel.

The present invention can be exemplified by the preferred embodiments as described hereinafter.

First Embodiment

FIG. 4A is a cross-sectional view of a transparent capacitive touch panel according to a first embodiment of the present invention, and FIG. 4B is an exploded view of the transparent capacitive touch panel in FIG. 4A. Referring to FIG. 4A and FIG. 4B, the transparent capacitive touch panel 400 of the embodiment comprises a transparent substrate 410, a transparent cover lens 420 and a transparent adhesive layer 430. The first transparent electrode layer 422 and the second transparent electrode layer 412 are disposed respectively on the surfaces of the transparent cover lens 420 and the transparent substrate 412. A transparent adhesive layer 430 is used to bind the first transparent electrode layer 422 and the second transparent electrode layer 412 so as to combine the transparent substrate 410 and the transparent cover lens 420 that are disposed in parallel.

Figure 2B:
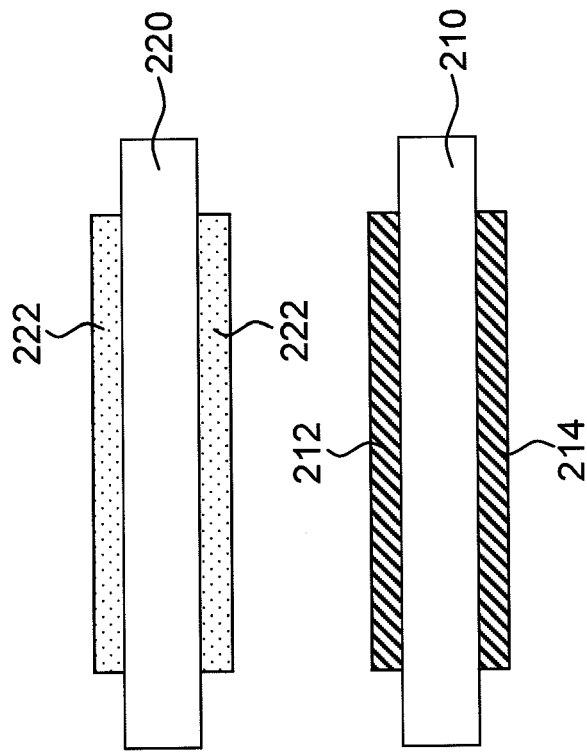
FIG. 2A and FIG. 2B are cross-sectional views of another conventional transparent capacitive touch panel.

Compared to the prior art, in which two indium-tin oxide layers are formed on the surface of the transparent substrate (as shown in FIG. 2B and FIG. 3B), in the embodiment, the second transparent electrode layer 412 and the first transparent electrode layer 422 are respectively formed on the surfaces of the transparent substrate 410 and the transparent cover lens 420. Therefore, the manufacturing process is simplified and the manufacturing yield is enhanced.

In the embodiment, the transparent substrate 410 comprises glass, the second transparent electrode layer 412 comprises indium-tin oxide, the transparent cover lens 420 comprises glass or plastic, and the first transparent electrode layer 422 comprises indium-tin oxide.

Then, the first transparent electrode layer 422 and the second transparent electrode layer 412 are disposed facing each other. A liquid-phase transparent adhesive layer 430 is used to bind the transparent substrate 410 and the transparent cover lens 420 disposed in parallel to complete the assembly of the transparent capacitive touch panel 400.

As mentioned above, the present invention is not restricted to the materials used for the transparent substrate 410, the transparent cover lens 420, the transparent adhesive layer 430, the first transparent electrode layer 422 and the second transparent electrode layer 412. For example, the transparent substrate 410 can comprise tempered glass; the transparent adhesive layer 430 can be a double-sided adhesive tape; and the first transparent electrode layer 422 and the second transparent electrode layer 412 can comprise indium-zinc oxide. Those with ordinary skills in the art can make modifications according to the aforesaid materials within the scope of the present invention.

Moreover, in the first embodiment, the second transparent electrode layer 412 is formed before the formation of the first transparent electrode layer 422. However, the present invention is not restricted to the forming order of the first transparent electrode layer 422 and the second transparent electrode layer 412.

Since the transparent capacitive touch panel 400 comprises a single-layer structure. Therefore, compared to dual-layer capacitive touch panel 100 (as shown in FIG. 1A), the transparent capacitive touch panel 400 of the embodiment is thinner and lighter. Moreover, in the present invention, no insulating layer is required. Therefore, the manufacturing process is simplified without using the mask so that the manufacturing cost of the transparent capacitive touch panel 400 is reduced.

In order to prevent dazzling light from the transparent capacitive touch panel, in the embodiment, an anti-reflection layer is further disposed on the surface of the transparent cover lens. As will be described hereinafter, similar labels refer to similar components.

Figure 5B:
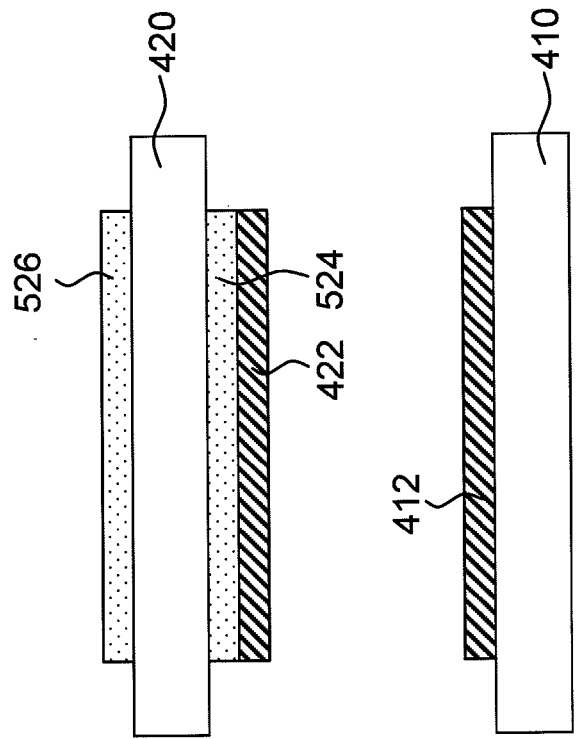
FIG. 5A and FIG. 5B are cross-sectional views of another transparent capacitive touch panel according to a first embodiment of the present invention.
Figure 5A:
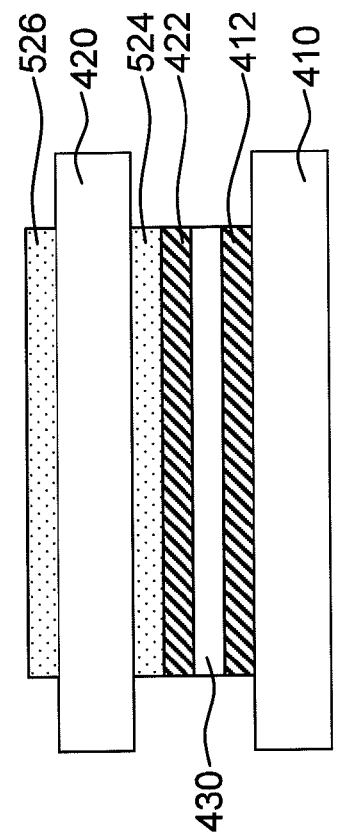

FIG. 5A is a cross-sectional view of another transparent capacitive touch panel according to a first embodiment of the present invention, and FIG. 5B is an exploded view of the transparent capacitive touch panel in FIG. 5A. Referring to FIG. 5A and FIG. 5B, the transparent capacitive touch panel 500 of the present embodiment is similar to the transparent capacitive touch panel 400 in FIG. 4A except that the transparent capacitive touch panel 500 further comprises two anti-reflection layers 524 and 526 to reduce the reflected light from the transparent cover lens 420.

The anti-reflection layers 524, 526 are respectively formed on the surfaces on both sides of the transparent cover lens 420. The anti-reflection layer 524 is disposed between the transparent cover lens 420 and the first transparent electrode layer 422, while the anti-reflection layer 526 is disposed on another side of transparent cover lens 420. Moreover, in the present embodiment, the anti-reflection layers 524, 526 are formed before the formation of the first transparent electrode layer 422. However, the present embodiment is not restricted to the forming order of the anti-reflection layers 524, 526 and the first transparent electrode layer 422.

Moreover, those with ordinary skills in the art can use only the anti-reflection layer 524 or the anti-reflection layer 526 within the scope of the present embodiment. Moreover, the present embodiment further comprises a decoration layer for patterning. The decoration layer is patterned with symbols such as a trademark and texts such as a slogan, as will be described hereinafter.

Figure 6B:
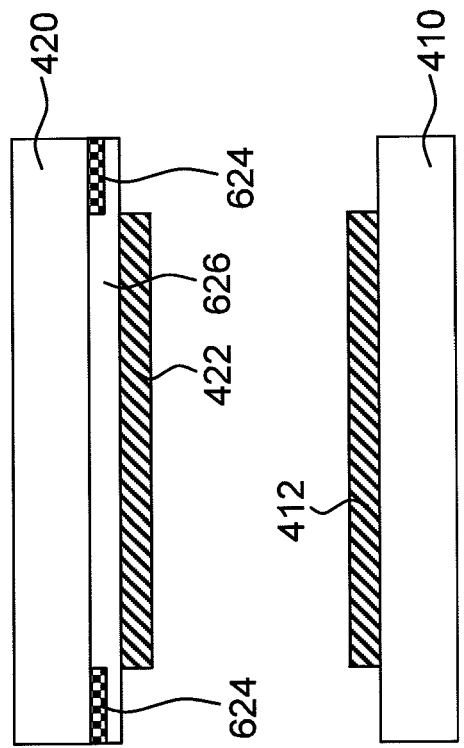
FIG. 6A and FIG. 6B are cross-sectional views of still another transparent capacitive touch panel according to a first embodiment of the present invention.
Figure 6A:
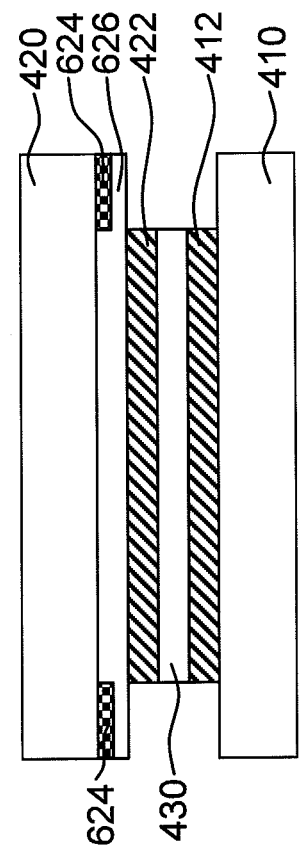

FIG. 6A is a cross-sectional view of still another transparent capacitive touch panel according to a first embodiment of the present invention, and FIG. 6B is an exploded view of the transparent capacitive touch panel in FIG. 6A. Referring to FIG. 6A and FIG. 6B, the transparent capacitive touch panel 600 of the present embodiment is similar to the transparent capacitive touch panel 400 in FIG. 4A except that the transparent capacitive touch panel 600 further comprises a decoration layer 624 and a planarization layer 626. The decoration layer 624 is patterned with monochromatic or multi-chromatic texts or symbols.

In the present embodiment, the decoration layer 624 is formed on the surface of the transparent cover lens 420. Then, the decoration layer 624 is planarized to form a planarization layer 626. The decoration layer 624 is black or any other color. The decoration layer 624 can be patterned with texts, symbols or the like. Moreover, the present embodiment can also do without the planarization layer 626; instead, the first transparent electrode layer 422 is directly formed on the surface of the decoration layer 624. As the planarization layer 626 is omitted, the decoration layer 624 comprises an insulating material. As the planarization layer 626 is used, the planarization layer 626 comprises an insulating material, while the decoration layer 624 comprises an insulating material or a conductive material.

In order to resist static charges or electro-magnetic interference, the transparent capacitive touch panel further comprises a shielding layer to prevent the interference from the display or the circuit board, as will be described hereinafter.

Figure 7B:
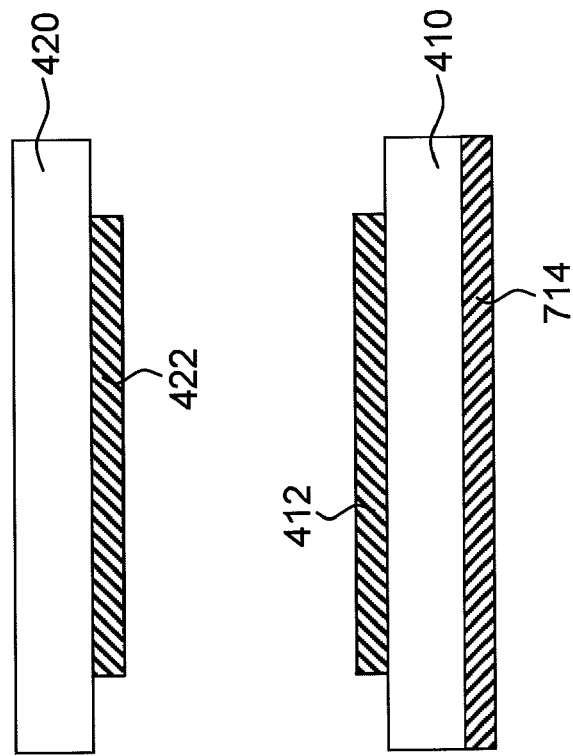
FIG. 7A and FIG. 7B are cross-sectional views of still another transparent capacitive touch panel according to a first embodiment of the present invention.
Figure 7A:
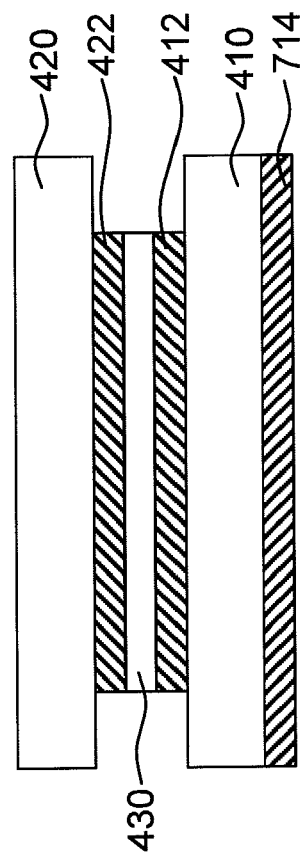

FIG. 7A is a cross-sectional view of still another transparent capacitive touch panel according to a first embodiment of the present invention, and FIG. 7B is an exploded view of the transparent capacitive touch panel in FIG. 7A. Referring to FIG. 7A and FIG. 7B, the transparent capacitive touch panel 700 of the present embodiment is similar to the transparent capacitive touch panel 400 in FIG. 4A except that the transparent capacitive touch panel 700 further comprises a shielding layer 714 to protect the structure of the transparent capacitive touch panel 700.

The shielding layer 714 is formed on a surface of the transparent substrate 410 that is different from the other surface whereon the second transparent electrode layer is disposed. Since the shielding layer 714 is capable of shielding the external electro-magnetic interference and preventing the capacitive touch panel from being interfered by external electro-magnetic interference, the shielding layer 714 comprises indium-tin oxide or indium-zinc oxide. The shielding layer 714 is a meshed structure and is electrically connected to the ground.

Since the anti-reflection layer, the decoration layer and the shielding layer are described independently, in the present embodiment, however, the anti-reflection layer, the decoration layer and the shielding layer can be formed together. Those with ordinary skills can make modifications by adding the anti-reflection layer, the decoration layer and the shielding layer to improve the quality of the transparent capacitive touch panel.

Since the transparent capacitive touch panel of the present invention is generally assembled with a liquid-crystal display (LCD) panel comprising a color filter, the transparent substrate of the present invention can be a color filter substrate to reduce the thickness and weight of the transparent capacitive touch panel assembled with a LCD panel.

Second Embodiment

The first embodiment describes a single-layer structure, wherein the first transparent electrode layer and the second transparent electrode layer are respectively disposed on the surfaces of the transparent substrate and the transparent cover lens. In the present embodiment, the first transparent electrode layer and the second transparent electrode layer can both be manufactured on the surface of the transparent cover lens. Thereby, the transparent capacitive touch panel can do without the transparent substrate to further reduce the thickness of the transparent capacitive touch panel, as will be described hereinafter.

FIG. 8 is a cross-sectional view of a transparent capacitive touch panel according to a second embodiment of the present invention. Referring to FIG. 8, the transparent capacitive touch panel 800 in the present embodiment comprises a transparent cover lens 810, a first transparent electrode layer 812, an insulating layer 814 and a second transparent electrode layer 816. The first transparent electrode layer 812, the insulating layer 814 and the second transparent electrode layer 816 are successively formed on the surface of transparent cover lens 810.

In other words, the first transparent electrode layer 812 is formed between the transparent cover lens 810 and the insulating layer 814. The insulating layer 814 is dispose between the first transparent electrode layer 812 and the second transparent electrode layer 816. The transparent cover lens 810 comprises glass or plastic.

Moreover, the insulating layer 814 comprises silicon nitride ($Si_xN_y$).

Figure 2A:
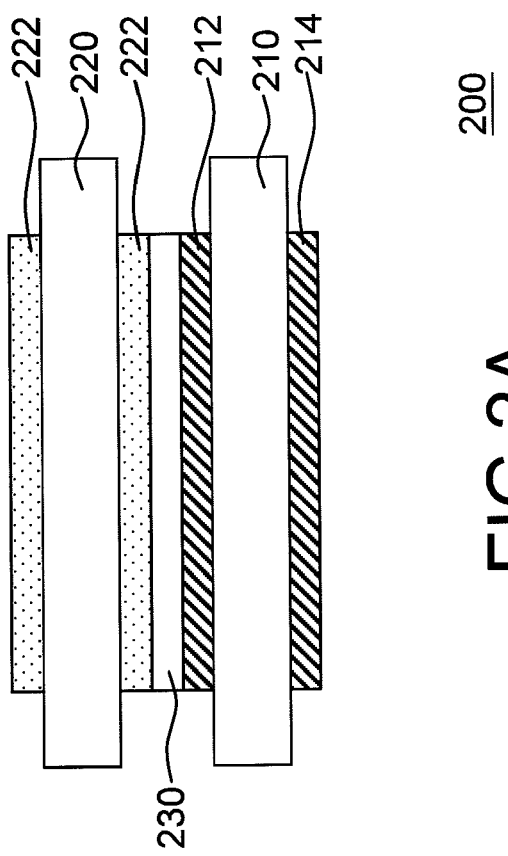

Compared to the prior art (such as FIG. 2A or FIG. 3A), the transparent capacitive touch panel 800 can do without the transparent substrate. Therefore, the thickness and weight of the capacitive touch panel 800 in the present embodiment can be significantly reduced. Moreover, since no more binding process is required in the making of the transparent capacitive touch panel 800, the manufacturing process can be simplified and the manufacturing cost can be reduced.

It is noted that, the anti-reflection layer and the decoration layer can be used in the present embodiment. Even though the best mode is presented in this specification, those with ordinary skills in the art can make modifications by adding the anti-reflection layer and the decoration layer and re-arranging the anti-reflection layer, the decoration layer and the first transparent electrode layer within the scope of the present embodiment.

FIG. 9 is a cross-sectional view of another transparent capacitive touch panel according to a second embodiment of the present invention. Referring to FIG. 9, the transparent capacitive touch panel 900 in the present embodiment is similar to the transparent capacitive touch panel 800 (as shown in FIG. 8) except that the transparent capacitive touch panel 900 further comprises an anti-reflection layer 918, a decoration layer 911 and a planarization layer 913. The materials for the anti-reflection layer 918, the decoration layer 911 and the planarization layer 913 are identical to those in the aforesaid embodiment and, thus the description thereof is not presented here.

More particularly, the anti-reflection layer 918 is disposed on the surface of the transparent cover lens 810 facing the first transparent electrode layer 812. The decoration layer 911 is disposed between the transparent cover lens 810 and the first transparent electrode layer 812. The planarization layer 913 is used to planarize the decoration layer 911 and is disposed between the decoration layer 911 and the first transparent electrode layer 812.

Accordingly, the transparent capacitive touch panel of the present invention is advantageous in that:

(1) Compared to the prior art, in which two indium-tin oxide layers are formed respectively on both sides of the surfaces of the transparent substrate, the manufacturing process in the present embodiment is simplified with higher manufacturing yield because the second transparent electrode layer and the first transparent electrode layer are respectively formed on the surfaces of the transparent substrate and the transparent cover lens.

(2) Moreover, since the transparent capacitive touch panel in the first embodiment can do without the insulating layer, the manufacturing process is simplified and the manufacturing cost is reduced.

(3) Compared to the dual-layer transparent capacitive touch panel, the thickness and weight of the single-layer transparent capacitive touch panel of the present embodiment are reduced. Moreover, the transparent capacitive touch panel in the second embodiment can do without the transparent substrate; therefore the thickness and weight are lowered compared to the conventional transparent capacitive touch panel.

(4) In the second embodiment, no binding process for the transparent capacitive touch panel is required so that the manufacturing process is simplified and the manufacturing cost is lowered.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An electrode structure of a capacitive touch panel, comprising:
   a cover lens for assembly with a display panel;
   a nongaseous insulating layer formed on a first side of the cover lens;
   an electrode layer formed on a first side of the nongaseous insulating layer; and
   a decoration layer disposed on a surface of the cover lens and patterned with at least one symbol or text.

2. The electrode structure of the capacitive touch panel as recited in claim 1, wherein the nongaseous insulating layer is a planarization layer.

3. The electrode structure of the capacitive touch panel as recited in claim 1, wherein the nongaseous insulating layer covers the decoration layer.

4. The electrode structure of the capacitive touch panel as recited in claim 1, wherein the decoration layer is disposed on a periphery of the cover lens.

5. The electrode structure of the capacitive touch panel as recited in claim 4, wherein the nongaseous insulating layer covers the decoration layer.

6. The electrode structure of the capacitive touch panel as recited in claim 1, wherein the decoration layer is disposed between the cover lens and the electrode layer.

7. A capacitive touch panel, comprising:
a cover lens for assembly with a display panel;
a first electrode layer disposed on a first side of the cover lens;
a nongaseous insulating layer disposed on a surface of the first electrode layer opposite the cover lens; and
a second electrode layer disposed on a surface of the nongaseous insulating layer opposite the first electrode layer; and
a decoration layer disposed on the cover lens.

8. The capacitive touch panel as recited in claim 7, further comprising a planarization layer disposed between the decoration layer and the first electrode layer.

9. The capacitive touch panel as recited in claim 7, wherein the decoration layer is disposed on a periphery of the cover lens.

* * * * *